(12) United States Patent
Ramirez et al.

(10) Patent No.: US 9,539,757 B2
(45) Date of Patent: Jan. 10, 2017

(54) PACKING TRAY HAVING CELL POCKETS WITH EXPANDABLE SIDEWALLS AND FLOATING BASE, AND METHOD OF MANUFACTURE

(71) Applicant: Tekni-Plex, Inc., King of Prussia, PA (US)

(72) Inventors: Richard L. Ramirez, Lawrenceville, GA (US); Mark A. Bergeron, Monroe, GA (US)

(73) Assignee: Tekni-Plex, Inc., Wayne, PA (US)

( * ) Notice: Subject to any disclaimer, the term of this patent is extended or adjusted under 35 U.S.C. 154(b) by 676 days.

(21) Appl. No.: 13/927,345

(22) Filed: Jun. 26, 2013

(65) Prior Publication Data

US 2015/0000231 A1    Jan. 1, 2015

(51) Int. Cl.
| | |
|---|---|
| *B65D 85/00* | (2006.01) |
| *B29C 51/10* | (2006.01) |
| *B65B 5/06* | (2006.01) |
| *B65D 81/133* | (2006.01) |
| *B65D 5/50* | (2006.01) |
| *B65D 85/34* | (2006.01) |
| *B29L 31/00* | (2006.01) |
| *B29C 51/08* | (2006.01) |

(52) U.S. Cl.
CPC .............. *B29C 51/10* (2013.01); *B65B 5/068* (2013.01); *B65D 5/503* (2013.01); *B65D 81/133* (2013.01); *B65D 85/34* (2013.01); *B29C 51/082* (2013.01); *B29L 2031/7134* (2013.01)

(58) Field of Classification Search
CPC .............. B65B 5/00; B65B 5/06; B65B 5/068; B65B 5/08; B65D 5/503; B65D 5/127; B65D 5/133; B65D 5/34; B65D 81/113

USPC ...... 206/521.6, 521.7, 521.8, 521.1; 264/321
See application file for complete search history.

(56) References Cited

U.S. PATENT DOCUMENTS

| | | | | |
|---|---|---|---|---|
| 2,843,496 | A * | 7/1958 | Altenburg | B65D 1/36 206/521.8 |
| 3,464,618 | A * | 9/1969 | Martelli | B65D 85/34 206/521.1 |
| 3,853,221 | A * | 12/1974 | Boyd | B65D 81/133 206/523 |
| 6,666,348 | B2 * | 12/2003 | Fore | B65D 1/26 220/315 |
| D506,397 | S * | 6/2005 | Hall | D9/757 |
| 7,931,148 | B2 * | 4/2011 | Hansen | B65D 43/162 206/461 |
| D649,460 | S * | 11/2011 | Davis | D9/456 |

* cited by examiner

*Primary Examiner* — Steven A. Reynolds
*Assistant Examiner* — Javier A Pagan
(74) *Attorney, Agent, or Firm* — Polsinelli PC

(57) ABSTRACT

Packing tray for protecting fragile and perishable food items, such as pears, which allows fruit items of varying dimensions and weights to be held securely in each pocket, and which allows a plurality of stacked trays and fruit to be packaged in boxes (e.g., standard carton sizes). The tray is a plastic foam sheet having a top wall and a plurality of recessed cell pockets, each cell pocket having a relatively thinner cell sidewall with expandable (accordion-like) flutes, and a relatively thicker bottom wall also with expandable flutes. This construction allows the cell bottoms in adjacent pockets and in adjacent trays of the stack to move relative to one another to accommodate various sizes and weights of fruit while still protecting the fruit from damage.

24 Claims, 19 Drawing Sheets

PACKING TRAY HAVING CELL POCKETS WITH EXPANDABLE SIDEWALLS AND FLOATING BASE, AND METHOD OF MANUFACTURE

FIELD OF THE INVENTION

The present invention relates to a plastic packing tray for pears adapted for stacking multiple such trays in a carton.

BACKGROUND

Packing trays having an array of cell pockets are commonly used to package fragile objects to enable their safe storage, transport and/or display. In particular, perishable food items such as fruit often are transported long distances in varying climates, e.g., from a relatively warm temperature (climate) where the fruit is harvested, to a relatively cool temperature (climate) where it will be consumed. Also, the perishable food item may be placed in or removed from cold storage at various times, following packing and before ultimate consumption. Exposure to such wide ranges of temperature and humidity may cause moisture and other condensation to form on the perishable item leading to bruising, spoilage and watermarks. The moisture and condensation may also deteriorate the prior art tray itself, leading to tearing which renders the tray difficult to handle such that the fruit may drop from the tray and become bruised and no longer acceptable to the customer. Still further, as fruit is a product of nature, each item differs in weight and dimensions. Despite a producer's/packager's best efforts at sorting, a tray needs to accept multiple fruit items with varying dimensions and weights without crushing the larger items or allowing undue movement of the smaller items.

Thus, there is need for a packing tray that provides sufficient protection from mechanical forces and from temperature and humidity variations encountered during packaging, shipment and/or storage so as to avoid damaging the fruit and avoid deterioration of the packaging, and which also allows fruit items with varying dimensions and weights to be packed in a uniform cell pocket tray without undue damage to either the larger or smaller items.

SUMMARY OF THE INVENTION

In accordance with one embodiment of the invention, a packing tray is provided for protecting fragile and perishable food items, such as pears, which allows fruit items of varying dimensions and weights to be held securely in each pocket, and which allows a plurality of stacked trays and fruit to be packaged in boxes (e.g., standard carton sizes). The tray is a plastic foam sheet having a top wall and a plurality of recessed cell pockets, each cell pocket having a relatively thinner cell sidewall with expandable (accordion-like) flutes, and a relatively thicker bottom wall also with expandable flutes. This construction allows the cell bottoms in adjacent pockets and in adjacent trays of the stack to move relative to one another to accommodate various sizes and weights of fruit while still protecting the fruit from damage. The cell bottom includes a central rounded depression surrounded at least partially by a plurality of circumferential expandable flutes which (together with the sidewall flutes) enable the depression to float, namely to move in multiple directions to accommodate pears of varying dimensions and weights.

In accordance with another embodiment of the invention, the tray is made of a rectangular plastic foam sheet with plural cell pockets and multiple hinges at at least two opposing corners of the rectangular tray to facilitate handling and removal of the tray and fruit from a carton with less product damage and less tearing of the tray at the handling locations.

Still further, the movable cell pockets enable adjustable nesting of the stacked trays so as to maintain a predetermined overall height of the stacked trays (and fruit) when packed in a carton (e.g., case of standard dimensions and volume), while still maintaining a protective cushioning of each fruit item in adjacent pockets and layers.

In accordance with one embodiment of the invention, a packing tray is provided for packaging pears and other pear shaped fruit, the packing tray comprising:

- a plastic foam sheet comprising a top wall and an array of recessed cell pockets extending from the top wall;
- the top wall having a peripheral surface surrounding the array of cell pockets and defining a top reference plane TRP;
- each cell pocket comprising a pear shaped recess having an elongated longitudinal axis LA parallel to the TRP and a transverse axis A;
- the pear shaped recess including an upper tapered cell portion to accommodate an upper tapered portion of a pear and a lower rounded cell portion to accommodate a larger diameter base of a pear;
- the tapered cell portion having a pair of opposing sidewalls that flare outwardly to join a rounded sidewall of the rounded cell portion, and the tapered cell portion having a bottom surface inclined with respect to the TRP and joining the flaring sidewall portions;
- the rounded cell portion further including a bottom portion including a plurality of circumferential flutes surrounding a central depression, the sidewall of the rounded cell portion including a plurality of linear flutes disposed substantially transverse to the TRP;
- wherein the sidewall flutes and circumferential flutes flex in response to the weight and dimensions of the fruit enabling the depression to move both parallel to and laterally with respect to the transverse axis A to accommodate different dimensions and weights of fruit disposed in each cell pocket.

In one embodiment, the top wall includes cell dividers between the pockets having divider surfaces in the TRP.

In one embodiment, the dividers include recessed surfaces below the TRP.

In one embodiment, the top wall includes a groove adjacent the upper tapered portion of each cell pocket shaped to receive a pear stem.

In one embodiment, the depression is a shallow recess.

In one embodiment, the depression has an oblong shape perpendicular to the transverse axis A, with the oblong depression having an elongated axis aligned with the elongated longitudinal axis L of the cell pocket.

In one embodiment, the oblong depression has a center point CP on the elongated axis that moves both parallel to the transverse axis A and laterally with respect to the transverse axis A in response to different dimensions and weights of fruit in the pocket.

In one embodiment, the cell pockets are arranged in longitudinal rows and columns.

In one embodiment, the sheet has a substantially rectangular perimeter and the cell pockets are arranged in a rectangular array of longitudinal rows and latitudinal columns.

In accordance with another embodiment of the invention, a stack of packing trays is provided comprising at least two packing trays stacked one on top of the other with fruit disposed in the cell pockets and the second tray rotated 180° with respect to the first tray.

In one embodiment, the plastic foam material comprises one or more of polystyrene, polyester, polyolefin, polypropylene, poly(lactic acid), including homopolymers, co-polymers and mixtures thereof, and including virgin and reclaimed materials.

In one embodiment, the plastic material comprises polystyrene foam.

In accordance with another embodiment of the invention, a method of making the packing tray comprises molding a plastic foam sheet between matching mold surfaces in a closed mold to form the cell pockets.

In one embodiment, the rounded cell portion bottom is relatively thicker than the rounded cell portion sidewall.

In one embodiment, at least the depression is relatively thicker than the rounded cell portion sidewall.

In one embodiment, the top wall is substantially rectangular shaped and has a foldable hinge formed in each of two opposing corners of the rectangular shaped top wall.

In one embodiment, the hinge comprises a reduced thickness hinge line in the top wall and a peripheral hinge portion, wherein the peripheral hinge portion can be folded at the hinge line.

In one embodiment, the peripheral hinge portion can be folded back on itself to provide a folded portion for gripping.

In one embodiment, the top wall includes a pair of opposing notched areas in the peripheral surface surrounding the array of cell pockets, the notched areas being disposed at opposing ends of the longitudinal rows.

In one embodiment, the notched areas are disposed along the longitudinal centerline of the array.

In one embodiment, a stack of packing trays is disposed in a box for storage, shipment or display.

In one embodiment, the box comprises a rectangular shaped base having interior dimensions that exceed the rectangular dimensions of the perimeter of the tray, thus providing a gap between the perimeter of the tray and the interior surface of the box.

In accordance with another embodiment of the invention, a packing case is provided comprising:
  a stack of packing trays comprising at least two packing trays stacked one on top of the other with fruit disposed in the cell pockets and the second tray rotated 180° with respect to the first tray;
  the trays accommodating variations in weight and dimensions of the fruit by deflection of the depression of the rounded cell portion.

In accordance with another embodiment of the invention, a method of packing fruit is provided comprising:
  packing fruit in the cell pockets of the packing tray;
  packing a second tray with fruit wherein the second tray is rotated 180° with respect to the first tray;
  allowing the varying weights and dimensions of the fruit in each pocket to displace the rounded cell portion;
  wherein the displacement allows fruit of varying dimensions and weights to be packed in a standard case volume.

DETAILED DESCRIPTION

FIGS. 1-18 show a packing tray 10 according to one embodiment of the invention. The packing tray 10 is formed from a single sheet of plastic foam, here polystyrene foam, and is particularly well-suited for packing pears or other pear-shaped fruit. The present embodiment is a non-limiting example of the invention.

Figure 4:
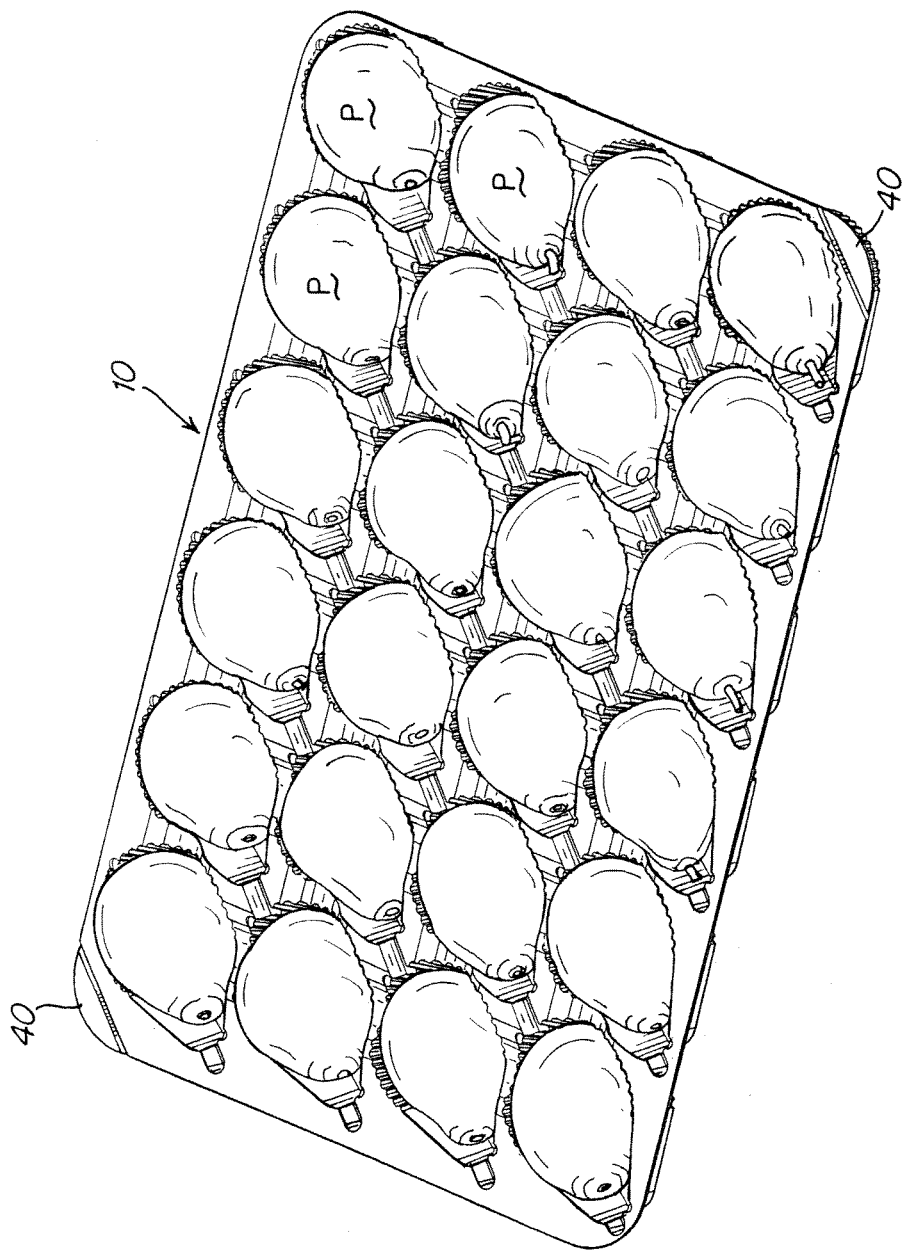
FIG. 4 is a perspective view of the FIG. 1 tray filled with pears.
Figure 5:
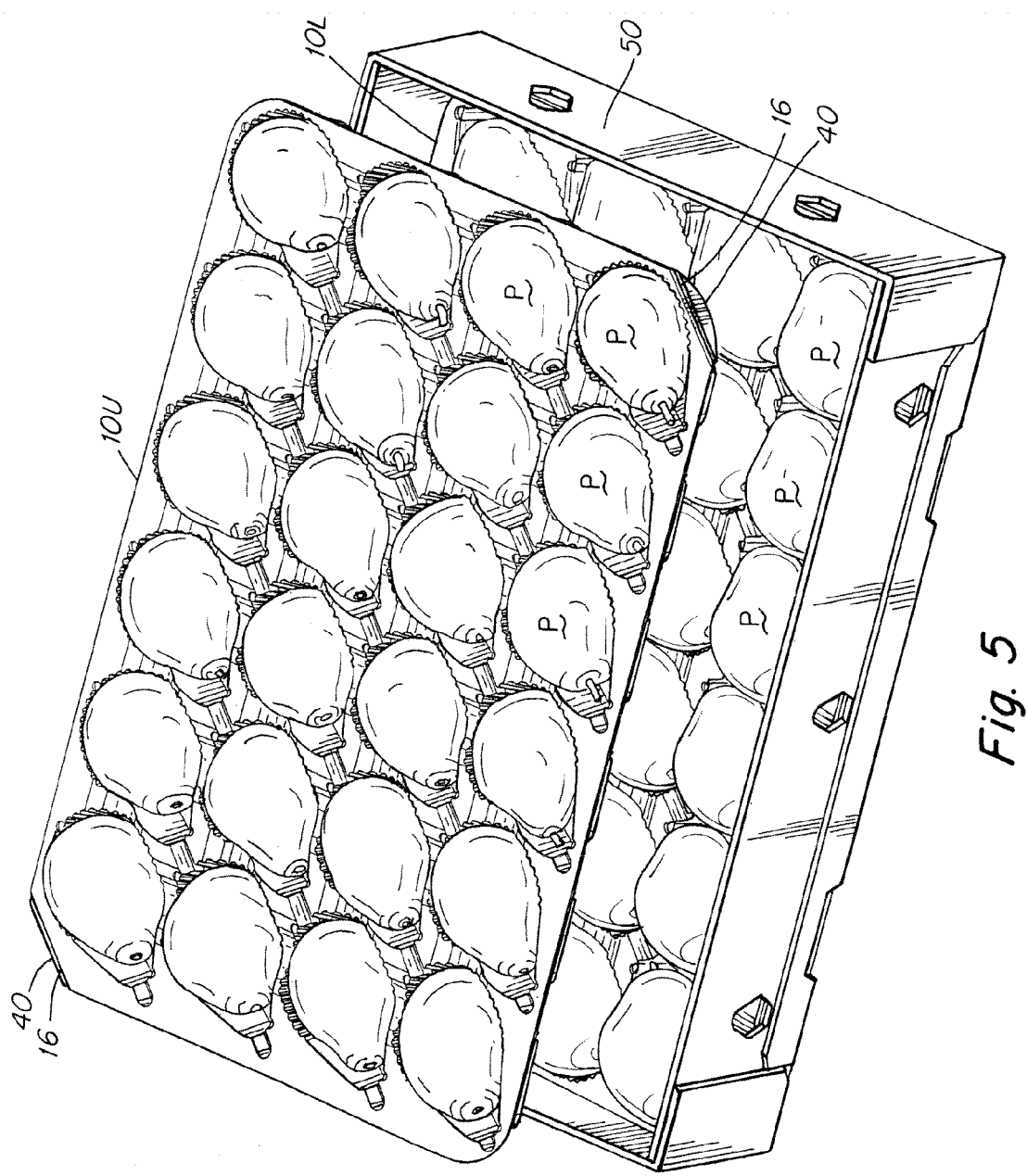
FIG. 5 is a perspective view of the FIG. 4 tray and pears being placed on top of a previously packed tray in the case, the top and bottom trays being rotated 180° with respect to one another.
Figure 6:
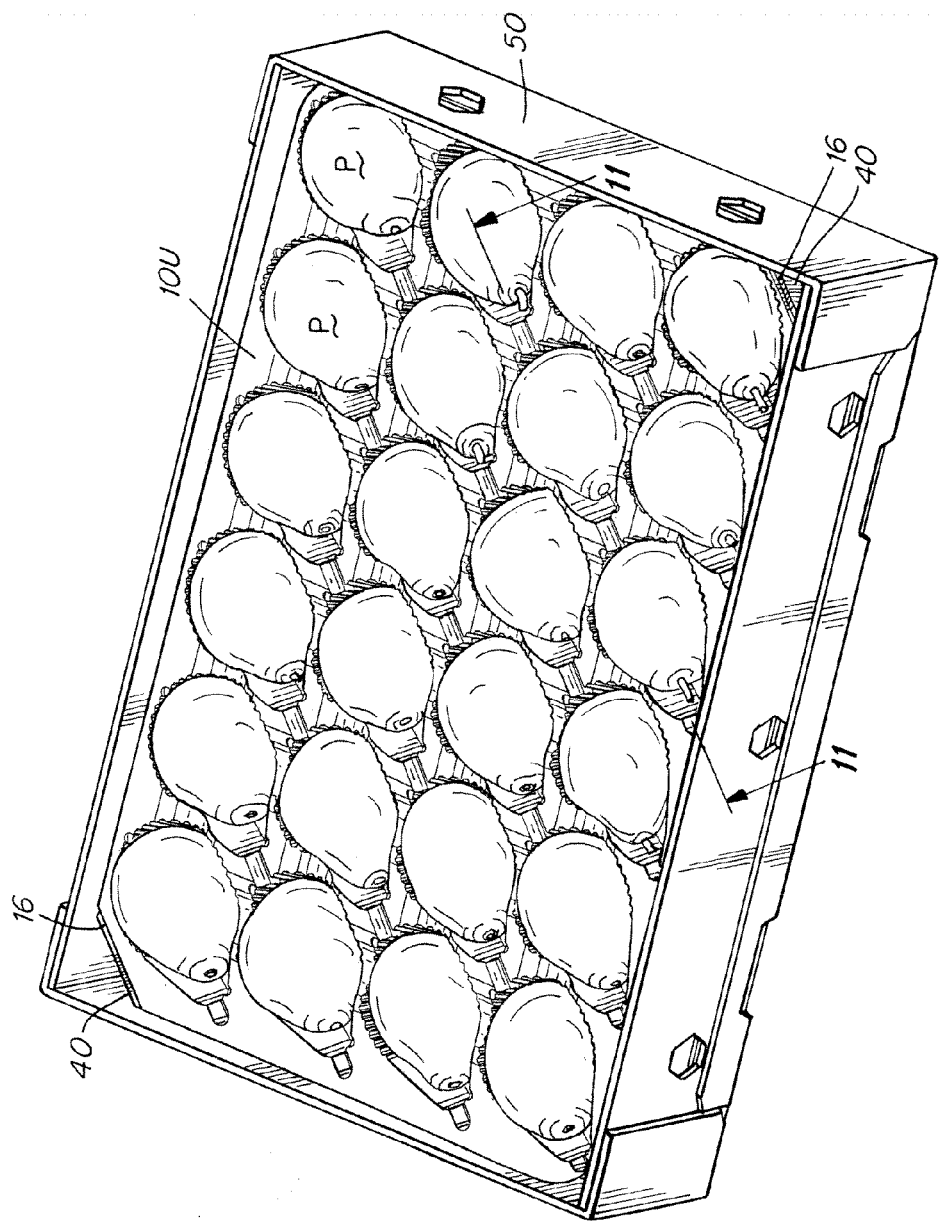
FIG. 6 is a perspective view of a fully stacked (2 layer) case.
Figure 7:
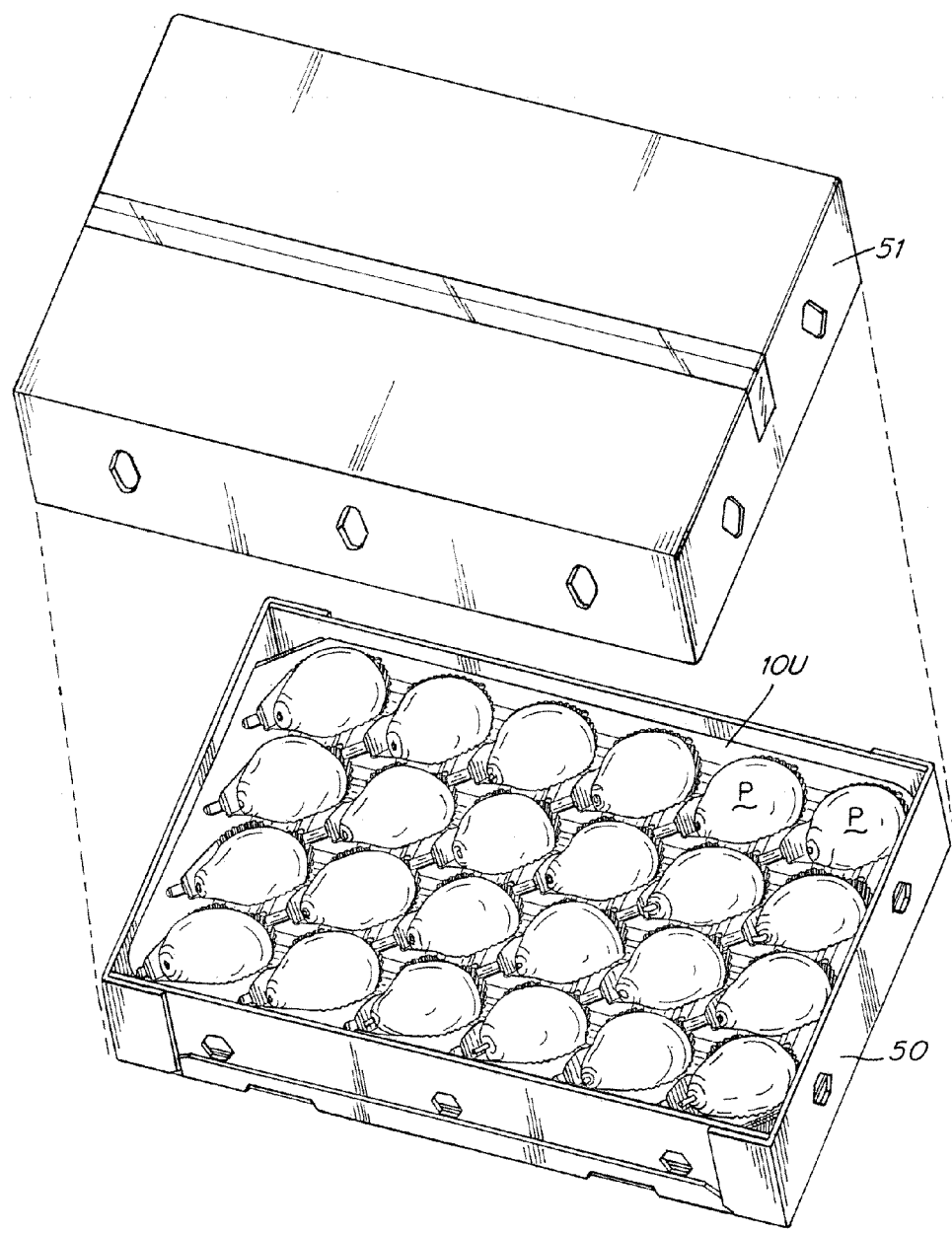
FIG. 7 is a partially exploded perspective view of a fully stacked case and lid.
Figure 8:
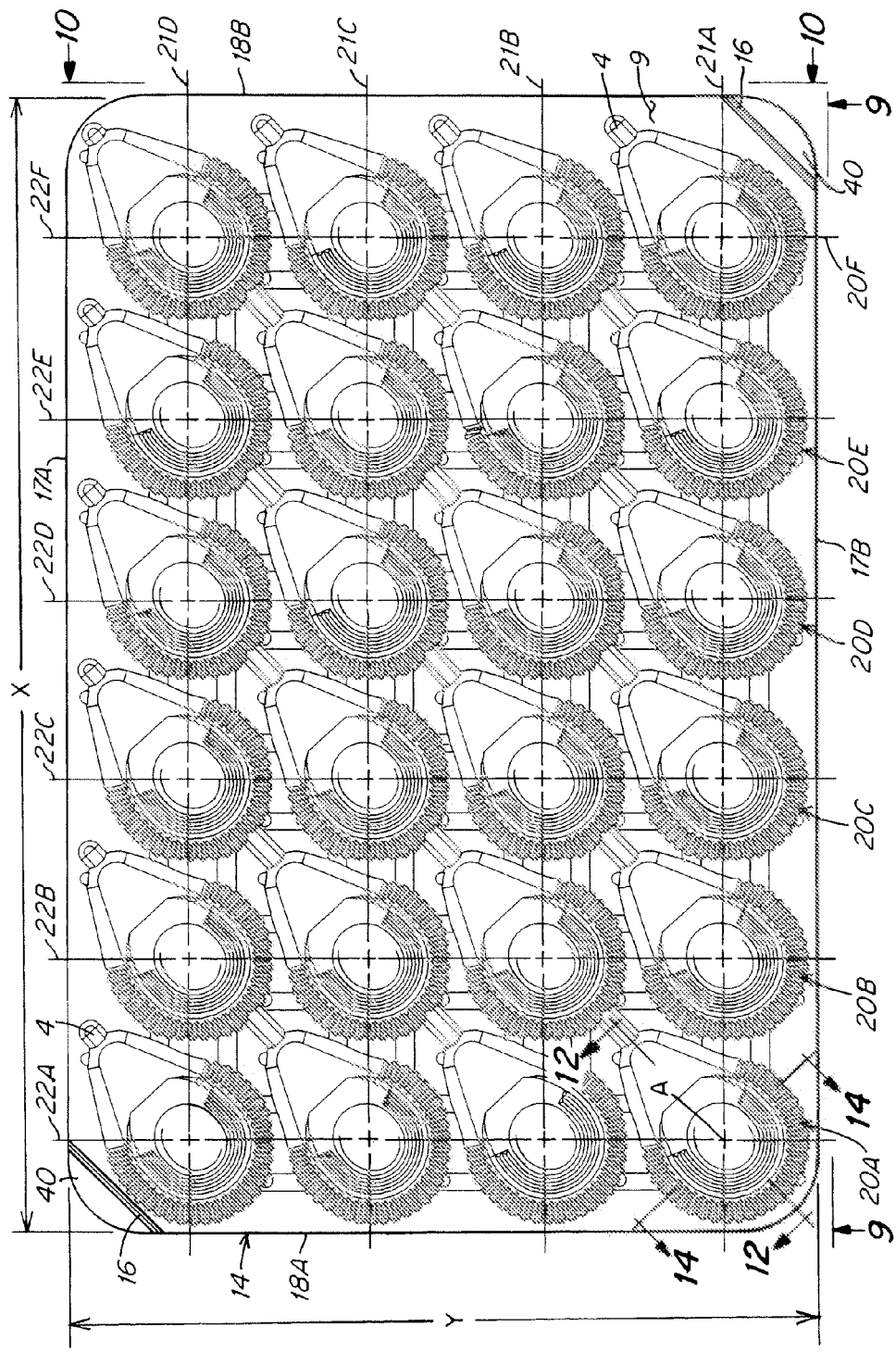
FIG. 8 is a top plan view of the FIG. 1 tray showing the array of cell pockets.
Figure 9:
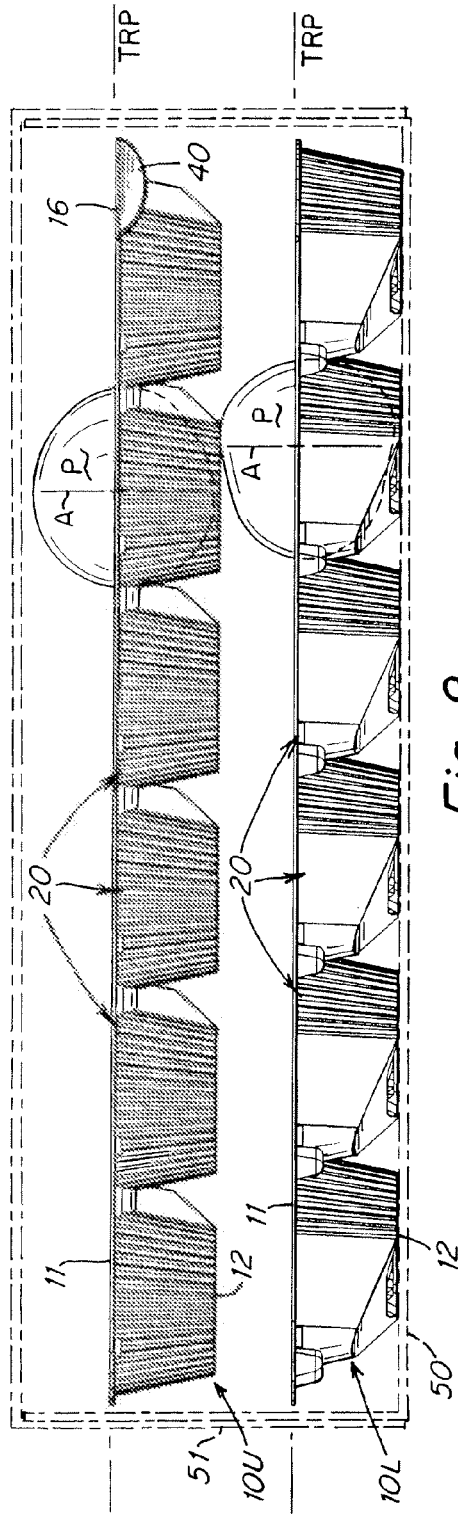
FIG. 9 is a front elevational view of two stacked trays as seen along line 9-9 of FIG. 8 showing two pears in nested top to bottom relation.

The packing tray 10 has a cellular construction with a plurality of cell pockets 20 depending downwardly from a top wall 8, each pocket formed to accommodate a pear or pear-shaped fruit to be packed therein (FIGS. 4-5). The tray is generally rectangular shaped with a longitudinal dimension X and a lateral dimension Y (FIG. 8). The perimeter 14 is formed by two opposing longitudinal edges 17A and 17B, and two opposing lateral edges 18A and 18B, joined by four rounded corners 19. Disposed about the perimeter is a top peripheral surface 9 of the top wall 8 surrounding the array of cell pockets 20 and defining a top reference plane TRP (FIG. 9). Cell dividers 7 between the pockets include divider surfaces 6 in this same common plane TRP as the top peripheral surface 9, and recessed surfaces 5 below the top reference plane TRP. The number, size and configuration (e.g., layout of rows and columns) of the cell pockets in a tray, and the size of the tray, will vary in different embodiments; for example, the total weight of fruit to be packed in a standard carton size will often determine how many cell pockets are provided in a given tray. Here the tray has dimensions of about 23 inches in length, 15 inches in width, and 1¾ inches in cell pocket height, with 24 pockets in a rectangular (6×4) array.

The packing tray 10 has an upper surface 11 and an opposing lower surface 12. The cell pockets 20 have recessed (concave) inner surfaces formed from the top surface of the tray. Each cell pocket has a central transverse axis A (FIGS. 2, 12-15) extending through a center lowermost depression 3F of the cell pocket base 3D, the transverse axis A being disposed transverse to the reference plane TRP defined by the top peripheral surface 9 of the tray. Each cell pocket is formed as a pear shaped recess extending downwardly from (transverse to) the top reference plane, the pocket 20 having an elongated longitudinal axis LA (FIG. 2) coinciding with the longitudinal axis of the pear to be fitted (on its side) in the pocket, and transverse to the transverse central axis A. Each pocket has substantially the same dimensions as molded, however as described below the sidewall and bottom of each pocket is designed to move so that it can accommodate variations in the size and weight of the individual fruit item in each pocket.

Figure 2:
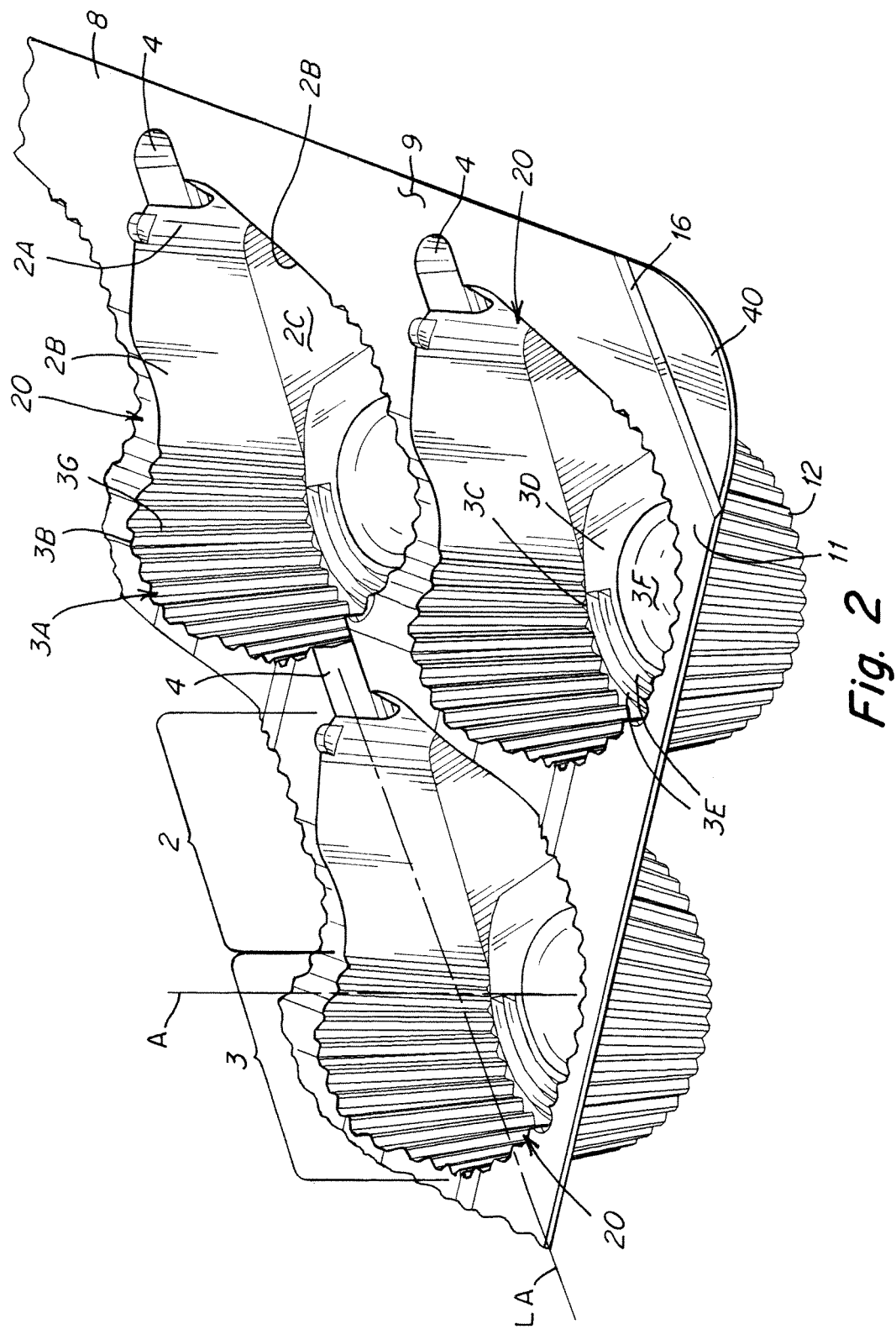
FIG. 2 is an enlarged detail perspective view of a corner of the FIG. 1 tray showing three cell pockets and a hinged corner for improved handling.
Figure 3:
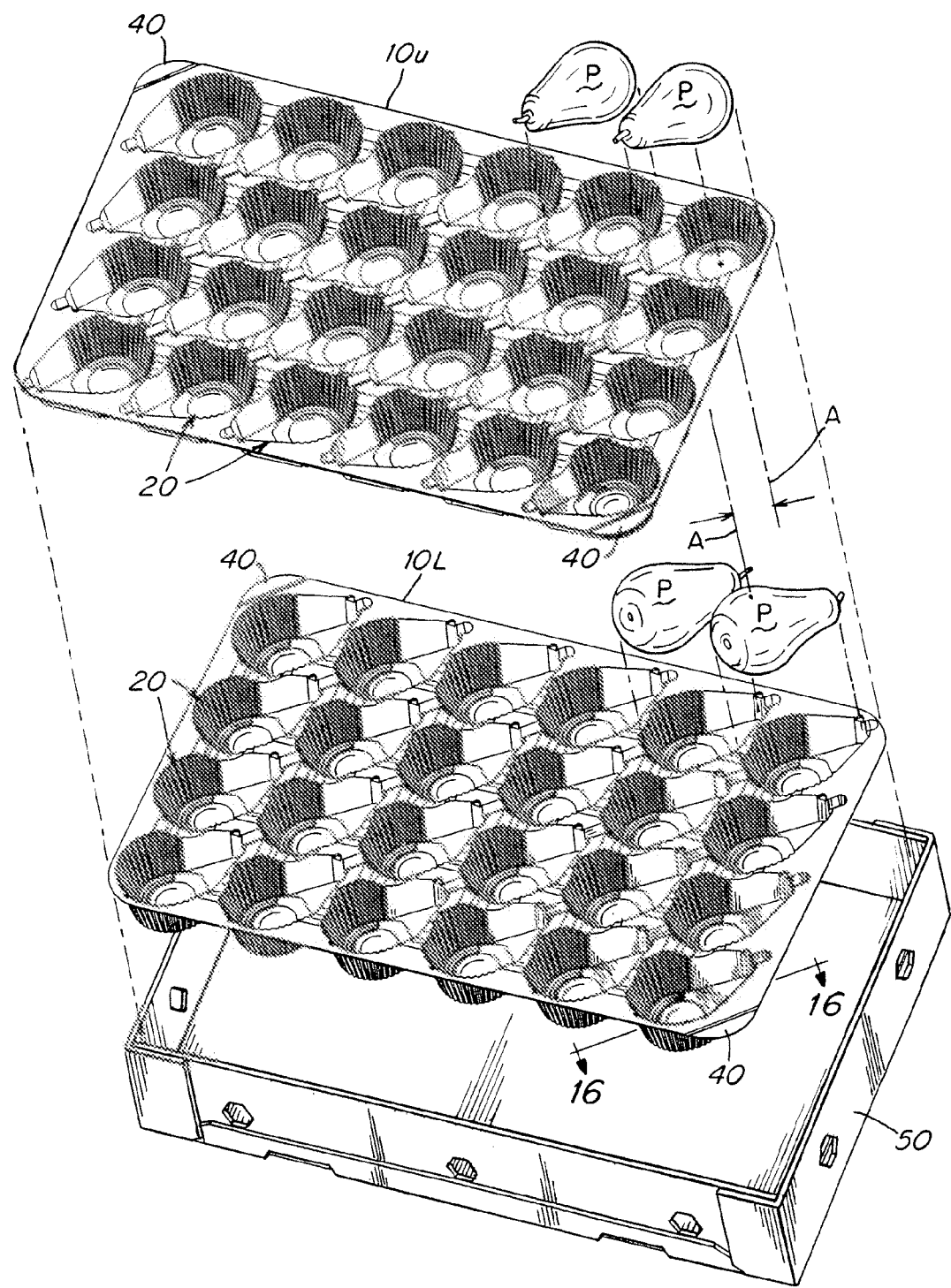
FIG. 3 is an exploded perspective view of a case for holding two stacked trays of pears, the top and bottom trays being rotated 180° with respect to one another.
Figure 12:
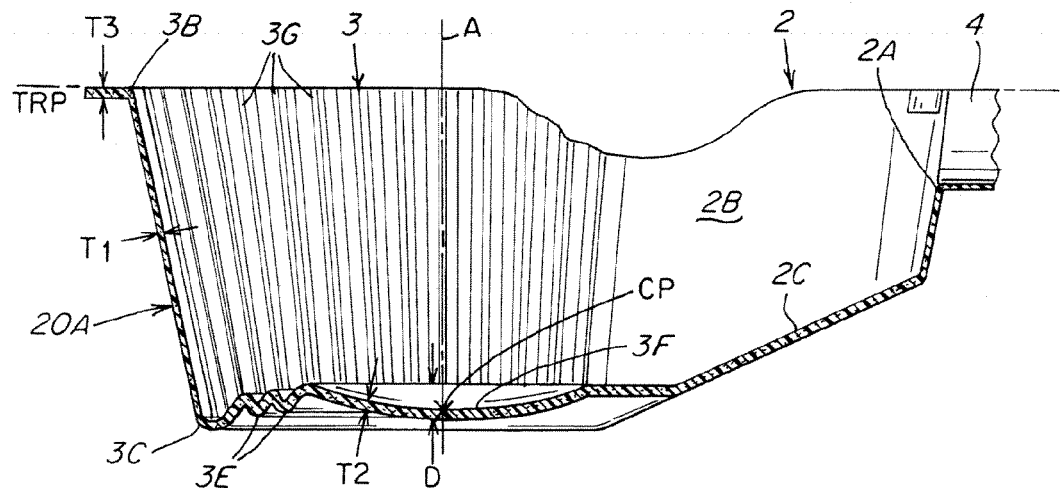
FIG. 12 is a cross-sectional side view of a single cell taken along line 12-12 of FIG. 8.
Figure 13:
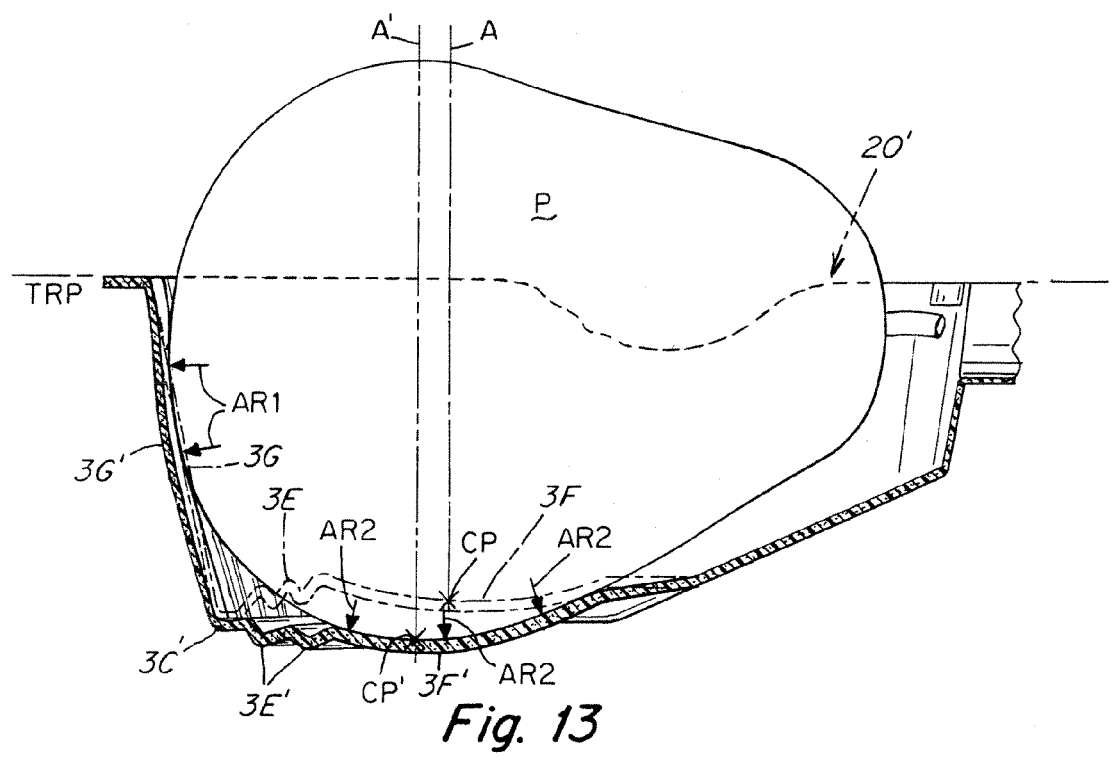
FIG. 13 is a cross-sectional side view similar of FIG. 12 but showing the expansion forces and movement of the cell pocket when a large pear is placed in the cell pocket.

More specifically, the cell pocket includes an upper tapered cell portion 2 and a lower rounded cell portion 3 (FIG. 2). The rounded cell portion 3 accommodates the larger diameter base of the pear, while the tapered cell portion 2 accommodates the upper tapered portion of the pear. A groove 4 is provided in the top wall for receiving the pear stem (if present). The tapered cell portion 2 has a sidewall and bottom, the sidewall having a rounded end 2A which then flares then outwardly to form two diverging planar sidewall portions 2B. The end 2A and planar portions 2B intersect at their lower ends with an inclined planar bottom wall 2C. In contrast, lower cell portion 3 has a rounded sidewall 3A forming a portion of a circumference of a tapered cylinder, where the upper edge 3B of the sidewall may flare radially outwardly (e.g., about 10°) from axis A (relative to lower edge 3C which joins the cell bottom 3D) to accommodate insertion and removal of the largest diameter of the pear base from the pocket. The cell pocket sidewall has a plurality of accordion like flutes aligned generally transversely (e.g., 10% to axis A) that allow the sidewall to expand. The lower cell portion 3 includes a generally planar bottom portion 3D, disposed generally parallel to tray upper wall peripheral portion 9. The bottom 3D of rounded cell portion 3 has a generally round perimeter 3C (where it meets the lower edge of sidewall 3A) and includes a plurality of circumferential flutes 3E surrounding a central depression 3F, which together form a floating base according to the present invention. The central depression 3F is a generally truncated portion of a sphere (here an oblong sphere), and is relatively shallow (having an initial interior depth D as shown in FIG. 12). The depression 3F can move both parallel to the transverse axis A as well as shift laterally with respect to the transverse axis A. FIG. 13 illustrates a center point CP of cell pocket depression 3F moving from an initial (as molded) location to a shifted (both transverse and axial) location CP' on axis A'. This combined range of movement (illustrated in FIGS. 11-17) allows the cell pocket base to shift to accommodate different dimensions and weights of fruit, and in particular allow stacked trays to accommodate both different size and weight of fruit in one tray, and different size and weight of the fruit in an adjacent tray (layer), without crushing the fruit or allowing excessive movement of the fruit in the cell pocket. This feature is illustrated in the FIGS. 9-17 and discussed further below.

Figure 10:
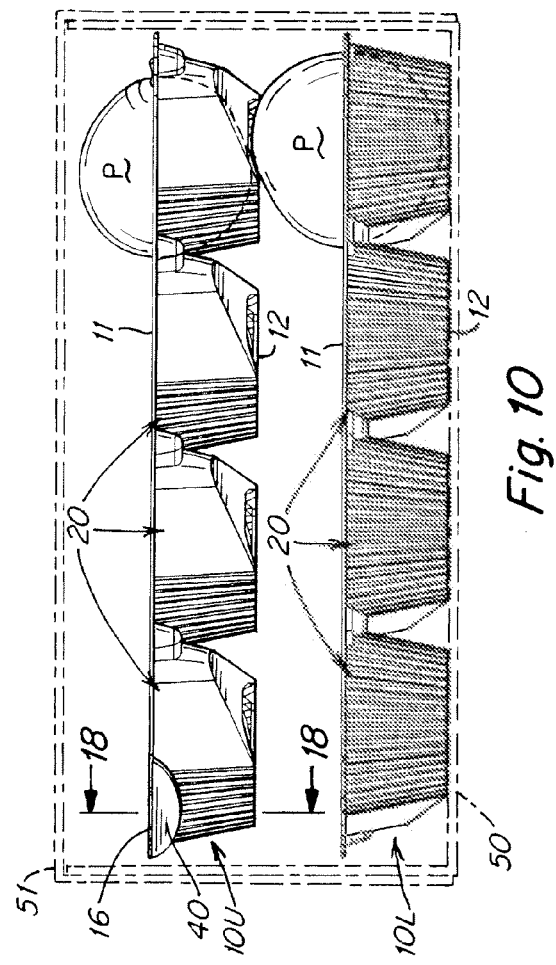
FIG. 10 is a right side elevational view of two stacked trays as seen along line 10-10 of FIG. 8 showing two pears nested in top to bottom relation.
Figure 11:
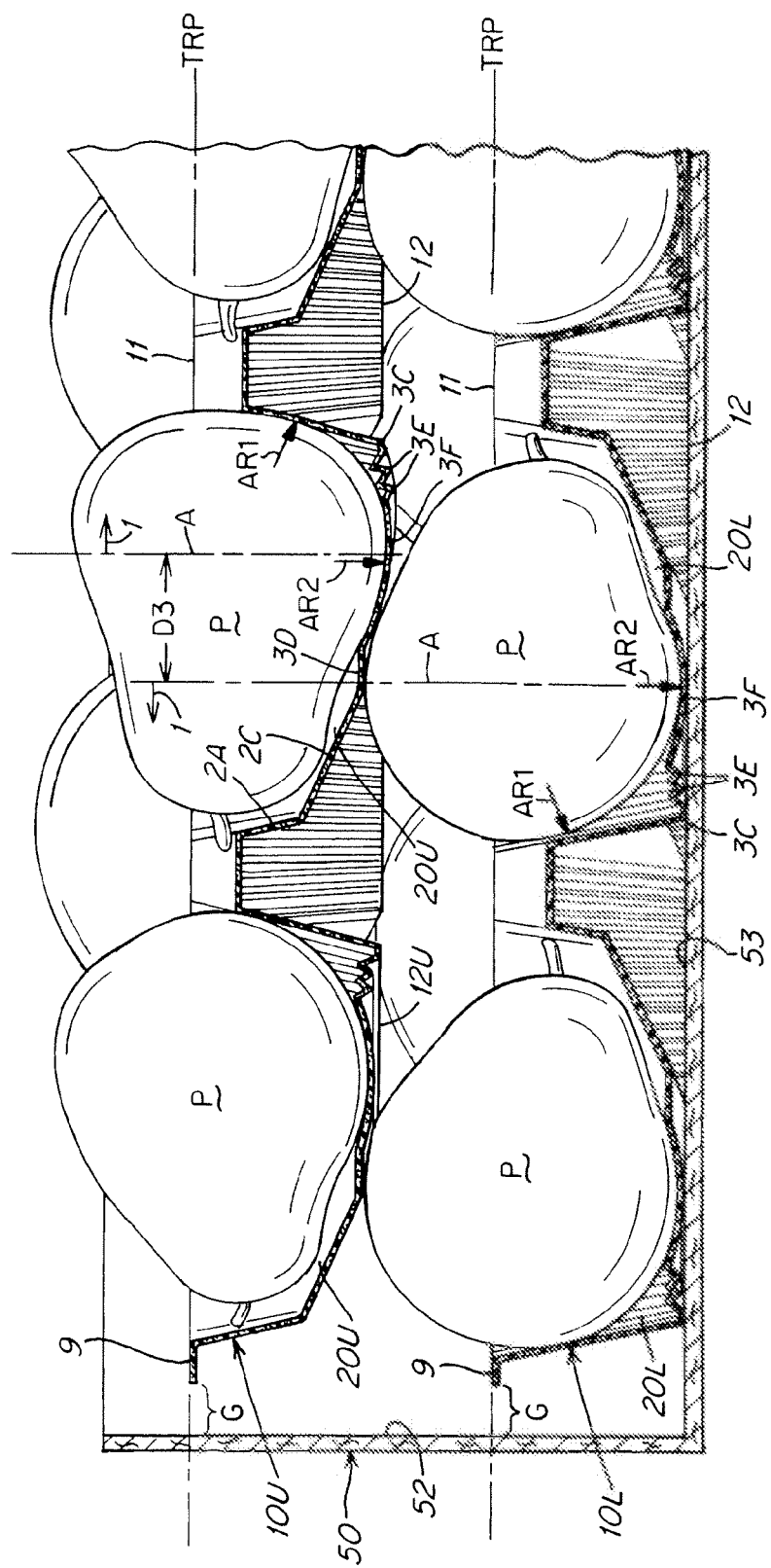
FIG. 11 is a fragmentary cross-sectional view of two stacked trays as seen along line 11-11 of FIG. 6 showing the nesting relation based on deflection of the movable cell pockets.

The trays 10 are intended to be stacked (see FIGS. 3-7, and 9-11) with each alternating tray rotated 180° from the adjacent tray so that in a pair of stacked trays, the tapered cell portion 2 of one cell pocket is aligned (with respect to axis A) with the rounded cell portion 3 of the cell pocket in the adjacent tray, and vice versa (see distance D3 between axis A of top pear in upper tray 10U and axis A of lower pear in lower tray 10L in FIG. 11). This enables packing more fruit in a given volume without crushing or bruising the fruit, while still limiting movement of each fruit item in a pocket. FIG. 11 shows in more detail a portion of two stacked trays with pears disposed in each of cell pockets 20U in the upper tray 10U and cell pockets 20L in the lower tray 10L. The pears are lying on their side in the tray cell pockets with the largest diameter base portion of the pear extending above the cell pocket (above top peripheral surface 9), the extending portion of the pear being accommodated by the inclined bottom wall of cell portion 2 above. A pear held in a cell pocket 20L of the lower tray 10L is engaged at one or more points on its surface by a bottom surface 12U of the upper tray 10U, e.g., by one or more of the adjacent outer surfaces of the cell pocket bottom or cell pocket sidewall. By thus nesting a pear between first and second trays, with the pear base residing between a cell portion 3 below and a cell portion 2 above, movement of the pear is substantially restricted. This helps prevent bruising and damage to the pear during storage and transport.

The cell pockets 20 are arranged in longitudinal rows (FIG. 8), where it is preferred that each row has the same number of cell pockets. FIG. 8 is a top plan view of a tray 10 having a first longitudinal row that includes six cell pockets 20A-20F, each cell pocket having a transverse axis A at the center of the base depression 3F that is aligned along the longitudinal tray axis 21A that is generally parallel to the two opposing longitudinal side edges 17A-17B of the tray 10. Similarly, second, third and fourth longitudinal rows each include six similarly disposed cell pockets aligned along respective longitudinal axes 21B, 21C, 21D all parallel to the longitudinal side edges 17A-17B.

The tray 10 includes an array of six longitudinally disposed cell pockets and four latitudinally disposed cell pockets, again with the transverse axis A of each cell pocket in a respective row and column aligned along a respective longitudinal row axis 21A-21D and aligned along a respective latitudinal column axis 22A-22F. The tray thus provides a rectangular array of cell pockets uniformly disposed in a 6×4 matrix, with a total of 24 cell pockets.

The fluted sidewall 3G and bottom portions 3F of each cell pocket that allow relative movement of each cell pocket with respect to adjacent cells in the same tray, and adjacent cells in an adjacent upper or lower tray, will now be described. FIG. 12 is a cross-sectional side view of a single cell pocket 20 taken along line 12-12 of FIG. 8. This sectional view illustrates a preferred difference in wall thickness of the cell sidewall 20A and 20B base portions. The sidewall has a generally thinner cross-sectional wall thickness T1 compared to the relatively thicker base wall thickness T2. The rounded sidewall portion has a plurality of linear flutes 3G, arranged around the sidewall and generally parallel to transverse axis A, to enable cell portion 3 of the cell pocket to expand radially (transversely) with respect to the transverse axis A. The base portion of the rounded cell portion 3 includes a plurality of flutes 3E circumferentially disposed around a lower portion of the central depression 3F, allowing movement of the base both parallel and transverse to transverse axis A. The top wall 8 has a thickness T3 that is preferably relatively thicker than the rest of the tray to provide strength and rigidity.

Figure 16:
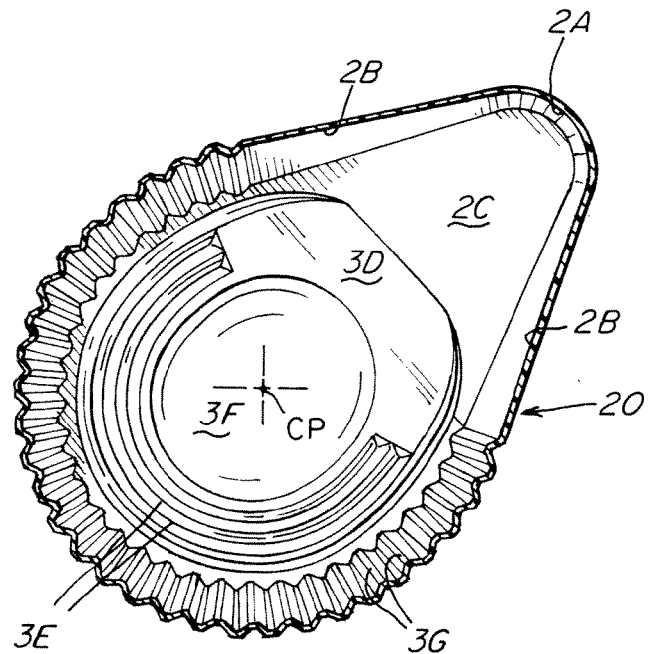
FIG. 16 is a cross-sectional plan view of a single cell pocket taken along line 16-16 of FIG. 3.
Figure 17:
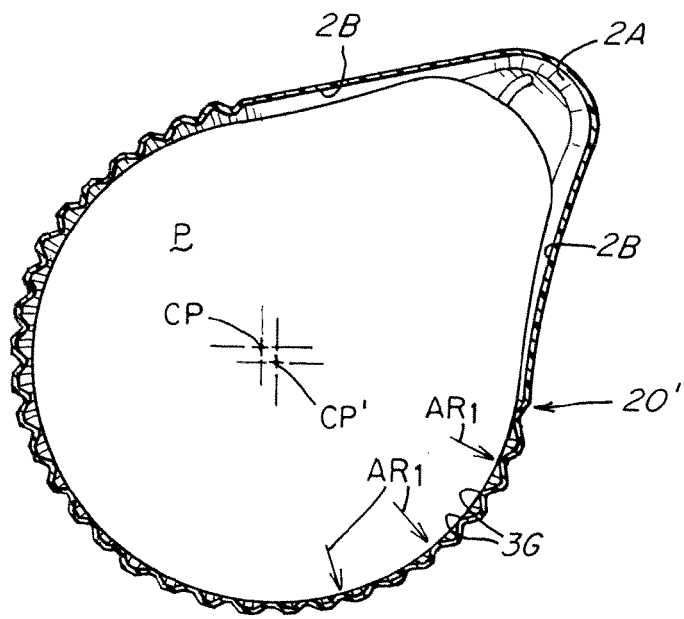
FIG. 17 is a schematic view similar to FIG. 16 but showing the offset when a large pear causes the cell pocket (CP) centerline to move.

FIG. 12 shows the "as molded" shape and dimensions of the cell pocket 20. In FIG. 13 the cell pocket 20' has expanded outwardly to accommodate a larger size pear. The arrows show expansion forces exerted on both the sidewall AR1 and base AR2 by a larger pear base P. The fluted sidewall 3G expands radially outwardly, transverse to axis A and parallel to TRP. The fluted base 3E moves outwardly both parallel to transverse axis A and at an oblique angle to transverse axis A, whereby the size and weight of the pear shifts the center point CP of the depression 3F from its as molded location (illustrated as a shift from CP on transverse axis A in FIG. 12, to CP' on axis A' in FIG. 13). As shown in FIG. 13, the lower surface of the depression 3F as molded lies above the peripheral base edge in FIG. 12, whereas in FIG. 13 the lower surface of the depression 3F' and the surrounding base flutes 3E' are now located below the peripheral sidewall edge 3C of the pocket. FIGS. 16-17 also shows this shift (distance D3) in the centerpoint (from CP to CP') due to movement of the floating base.

Figure 14:
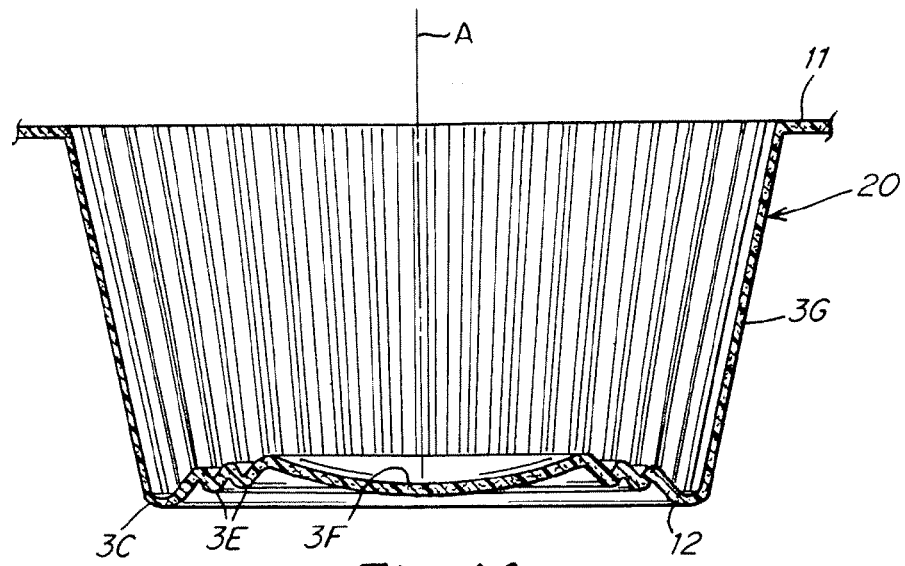
FIG. 14 is a cross-sectional end view of a single empty cell (as molded) taken along line 14-14 of FIG. 8.
Figure 15:
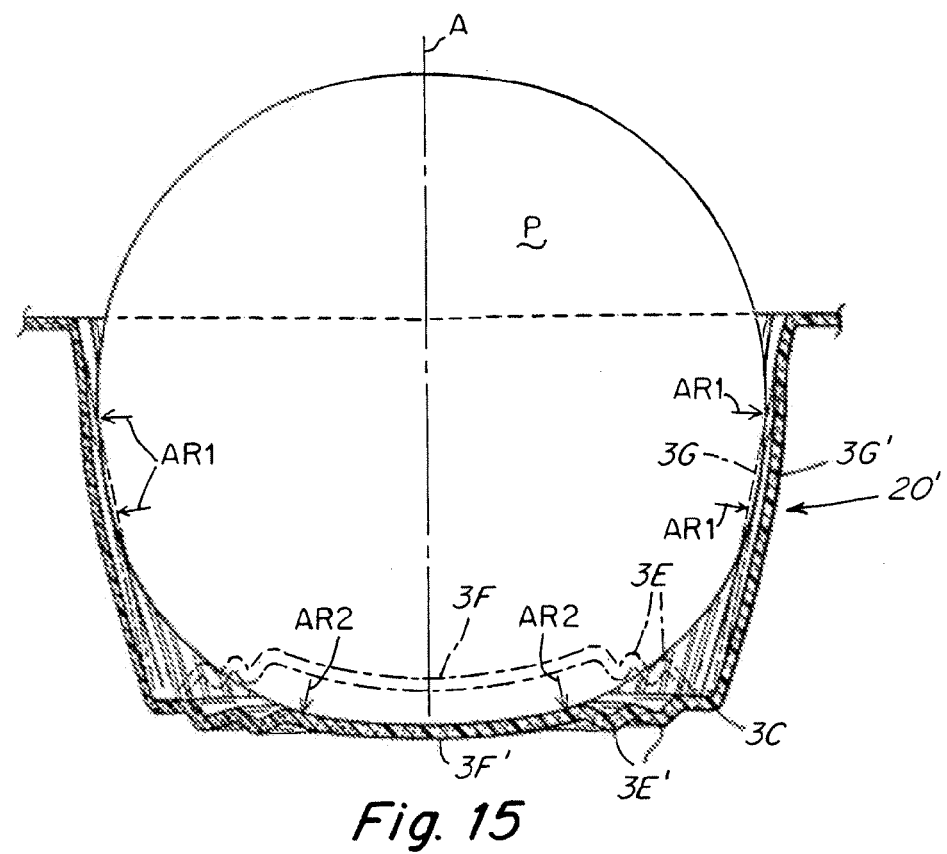
FIG. 15 is a cross-sectional view similar to FIG. 14 but showing expansion forces when a large pear is placed in the cell pocket.

FIGS. 14-15 show end views of the as molded cell pocket 20 (FIG. 14), and expanded pocket 20' accommodating a large pear base P (FIG. 15). The expansion forces AR1 and AR2 are accommodated by movement of the sidewall 3G' substantially transverse to axis A, and by the bottom 3E'/3F' both parallel and oblique to axis A.

FIG. 11 illustrates how movement of the respective cell pockets in a given tray also accommodates improved nesting of one filled tray above another. In FIG. 11 the lower cell pocket 20L can expand at least to the same plane as the bottom edge 3C of the pocket sidewall 3G, but no further as sidewall edge 3C of the lower tray 10L lies on the interior planar surface 53 of the bottom of carton 50. However, in the upper tray 10U a larger pear can deflect the cell pocket further downwardly wherein the depression 3F and base flutes 3E now extend below the sidewall edge 3C of the pocket. As shown by deflection arrows AR1 and AR2 in FIG. 11, the pear bases in the upper and lower trays move outwardly (away) from each other (see opposing directional arrows AR1, transverse to axis A) to better accommodate the larger fruit items in the stacked trays, while still fitting within a standard carton size.

The stacked trays can thus move relative to one another, as deflected by the relative weights of the pears in each pocket. To accommodate such movement there is preferably a gap G provided between the upper wall perimeter 14 of the tray and the inner sidewall surface of the carton 50. In other words, preferably both the longitudinal X and latitudinal Y dimensions of the tray 10 are less than the longitudinal and lateral dimensions of the inner surface 52 of the carton 50.

FIGS. 9-10 show a stack of two trays 10U and 10L, one on top of the other each holding a pear P and illustrating how the center points CP of each of cell pocket base portion 3 are offset with respect to the immediately adjacent tray. This alternating arrangement of upper and lower cell portions 2, 3 is accomplished by rotating each adjacent tray in the stack 180°. The trays in a stack are not required to be parallel (with respect to their TRPs), in order to protect the fruit. Rather the cushioning effect of the plastic foam and thicker cell bottom (particularly at depression 3F), and the movement allowed by the sidewall 3G and base 3E flutes, accommodate movement of the pears and/or the trays themselves to protect the fruit from excessive movement or damage.

It is preferred that the opening in the top wall of the tray formed by the rounded cell pocket portion 3 be greater than the nominal maximum diameter of the pear P. This provides ease of access for inserting the fruit into each pocket and removing the same. Preferably the height H1 of the cell pockets (FIG. 12) is such that most of the fruit (at least 50% of fruit diameter, and more preferably at least 65%) lies within the pocket (is encapsulated thereby) to protect and hold the fruit in place, while the increased bottom wall thickness cushions and protects the fruit from bruising.

In various embodiments, the plastic foam material of the tray is preferably one or more of polystyrene, polyester (e.g., polyethylene terephthalate (PET)), polyolefin (e.g., polyethylene (PE), polypropylene (PP)), polyvinyl chloride (PVC), or poly(latic acid (PLA), including homopolymers, copolymers, mixtures and blends thereof, and including virgin and reclaimed (recycled) materials.

The actual dimensions of the tray and cell pockets will depend upon the tray material and on the dimensions of the fruit F, including the fruit nominal diameter D2 (e.g., $2^{5/8}$, $3^{7/8}$ or $3^{1/16}$ inch diameter)

Typically, multiple trays are packed in a box for shipment. In one embodiment (FIGS. 9-10), two stacked trays 10U-10L (rotated 180°) are enclosed in a paperboard shipping box 50, here the box 50 comprising a standard case size with internal dimensions of about 23×15 inches and height from about $5^{3/4}$ to $6^{1/2}$ inches, weighing about 30 pounds (total weight including fruit, tray and carton base and lid), each tray 10 having 24 pockets, and each pocket holding one pear, a total of 2×24=48 packaged in one box (e.g., 48 pears, aligned lengthwise in the pockets with their stems generally parallel to the top reference plane).

When packed, the packing trays 10U, 10L are arranged such that the fruit F of the lower stack packing tray 10L is nested between, and in abutting contact with the exterior surfaces of one or more cell pockets (and/or cell dividers) of the upper packing tray 10U. The abutting engagement of the cell pockets and/or cell dividers against the fruit F provides a holding force therefore. The cell pockets 20 and cell dividers 30 are preferably formed with smooth outer surfaces to limit damage to the fruit F. Also, the tray material (plastic foam) preferably provides compressibility which deflects under the weight of fruit F and also acts to limit damage to the fruit F.

Figure 18:
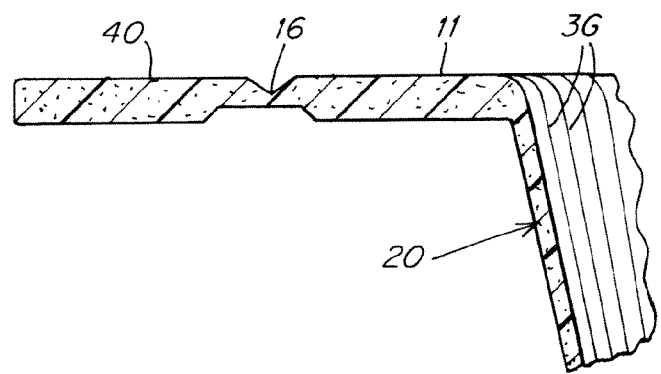
FIGS. 18-20 are three partial schematic views of a corner hinge as molded (FIG. 18), partially folded down (FIG. 19), and fully folded and grasped by a packer's fingers (FIG. 20)
Figure 19:
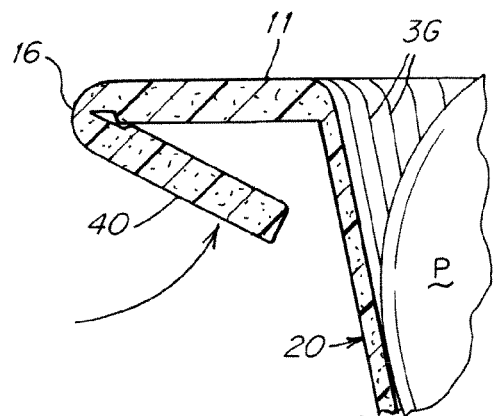
Figure 20:
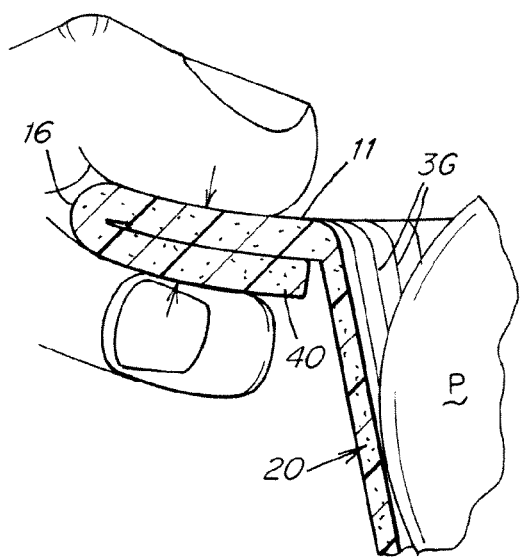

FIGS. 18-20 illustrate a hinge feature at opposing corners of the tray 10 to facilitate grasping (e.g., lifting and removal of a filled tray from a carton). FIG. 18 shows a portion of a cell pocket 20 at the corner of the tray, with a hinge portion 40 in top wall 8 of the tray 10. The reduced thickness hinge line 16 facilitates folding of the hinge portion 40, as illustrated in FIG. 19. The hinge 4 can optionally be folded back onto itself as illustrated in FIG. 20, wherein two fingers of a packer are shown grasping the folded hinge 40 portion and peripheral portion of the top wall 8. This facilitates ease of handling during removal or insertion of the filled tray from a carton, or during transport of a filled tray. Preferably, hinge 16 is formed by comprising top wall 8 inwardly from both of its upper and lower surfaces, thereby increasing the density of the foam material at the hinge to provide greater strength that resists tears.

Figure 21:
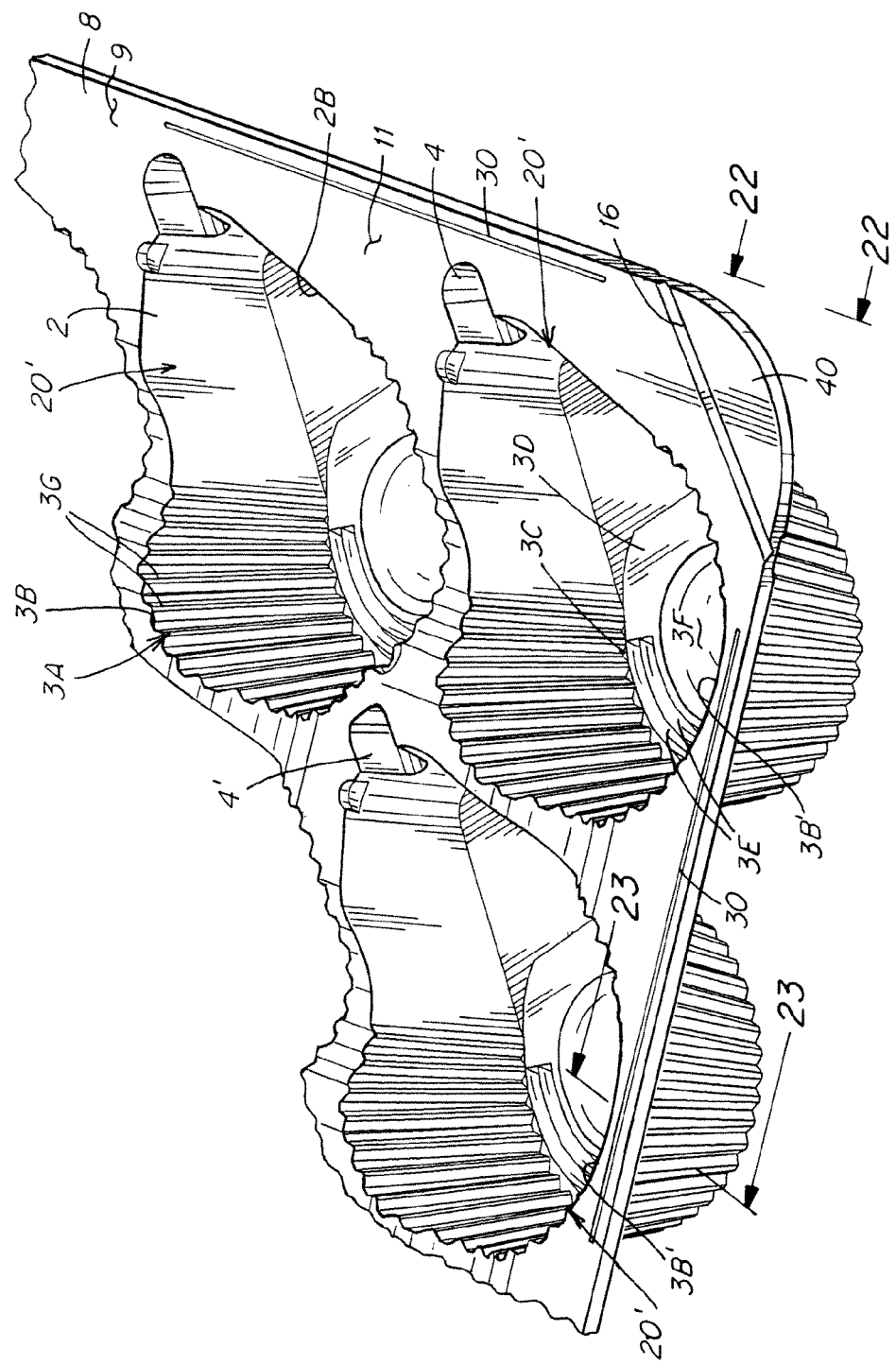
FIG. 21 is an enlarged detail perspective view similar to FIG. 2 but showing an alternative embodiment of a tray having cell pockets wherein a top portion of the sidewall flutes have been modified to further resist tearing.
Figure 22:
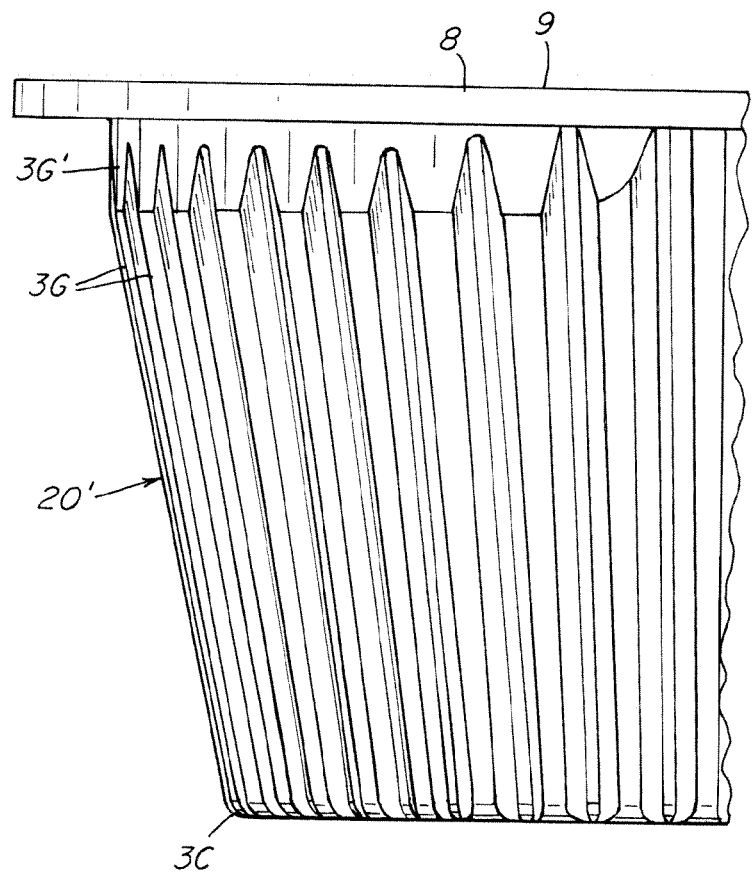
FIG. 22 is a fragmentary end view of the tray as seen along line 22-22 of FIG. 21.
Figure 23:
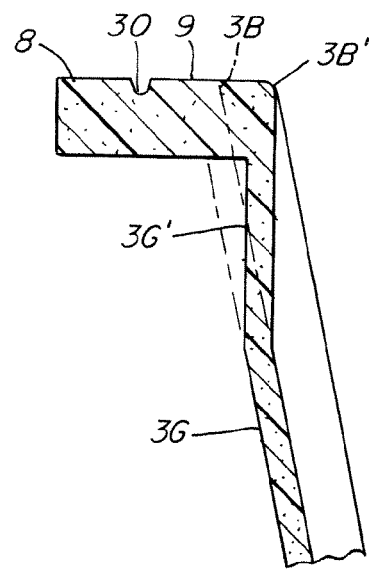
FIG. 23 is a cross-sectional detailed view taken along line 23-23 of FIG. 21 showing the modified flutes.

FIGS. 21-23 illustrate an alternative embodiment of a tray having a modified cell pocket 20' wherein a top portion of the sidewall flutes 3G are of a reduced thickness (e.g., compressed) and are angled with respect to lower flute portion 3G, as best seen in FIGS. 22-23, the top flute portion 3G now lies substantially parallel to cell axis A. FIG. 23 shows lower portion 3G; aligned with plane 3B (inclined e.g., about 10° with respect to transverse cell axis A) and top portion 3G' aligned with plane 3B' (parallel to transverse cell axis A). This provides a further resistance to tearing of the cell pocket sidewall, particularly for cell pockets disposed adjacent to the side edge 14 of the peripheral top wall 8 of the tray.

The tray of FIGS. 21-23 also includes fault lines 30 aligned parallel to side edge 14 of the top wall of the tray, as a further enhancement to deter or terminate any tears that initiate along the peripheral side edges of the top wall 8 of the tray. The fault line(s) may be continuous or interrupted and are shown as a narrow groove formed in the top surface 9 of the top wall 8 (FIG. 23).

In the embodiment of FIGS. 21-23, all of the stem grooves 4' have a closed top end portion between the adjacent cell pockets, to further resist tearing or deformation of the tray.

Figure 24:
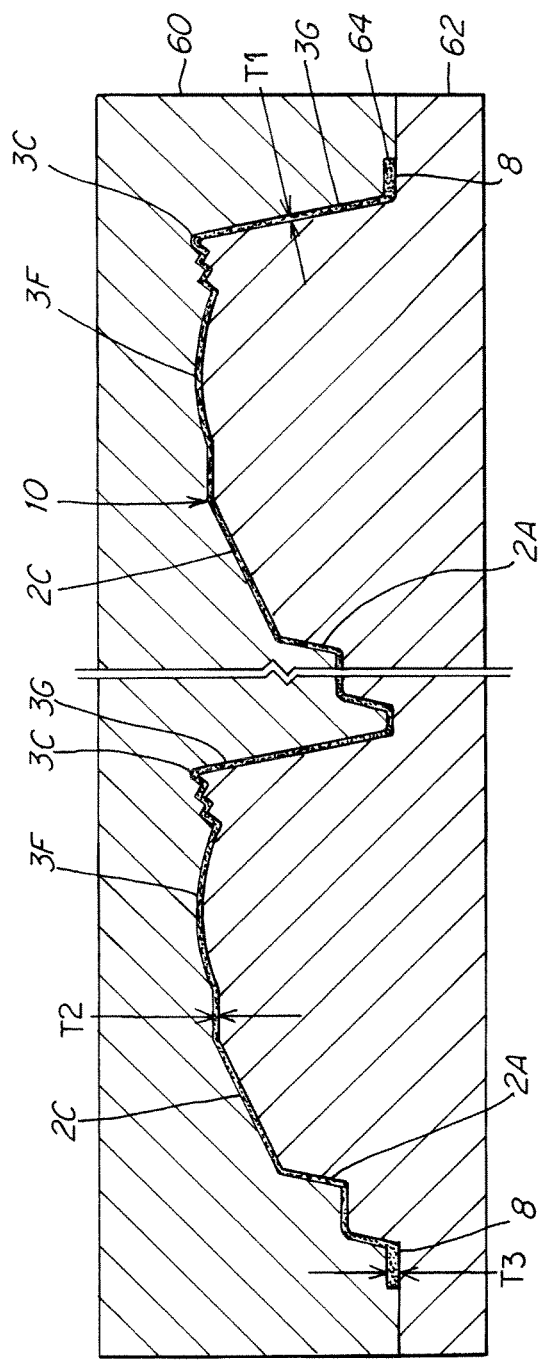
FIG. 24 is a cross-sectional view of one embodiment of a closed mold, including a top mold portion and bottom mold portion defining a cavity therebetween for forming a tray according to one embodiment of the invention.

FIG. 24 illustrates one embodiment of a closed mold for forming a tray 10. The mold includes a female or top mold 60 and male or bottom mold 62, having adjacently disposed formed surfaces that together define a cavity 64 of varying thickness in which the tray 10 is formed. A sheet of material is inserted between the top and bottom mold surfaces, whereby the application of heat (before and/or after insertion) and vacuum pressure, along with the varying cavity thicknesses, produces a thermoformed tray having the desired shape and thickness variation. In one embodiment, the relative thicknesses of the tray portions are as follows: top wall 8 having thickness T3, cell base having thickness T2, and cell sidewall having thickness T1, wherein T3 is greater than T2 is greater than T1. Generally, the tray thickness ranges from 3/64 to 3/16 inches for and T3, and 30/1000 to 60/1000 inches for $T_1$, for example in a tray having overall dimensions of 22.638 inches (575 mm) in length and 14.764 inches (3.75 mm) in width, with cell pockets heights of 1½ to $2^{5/8}$ inch.

Figure 1:
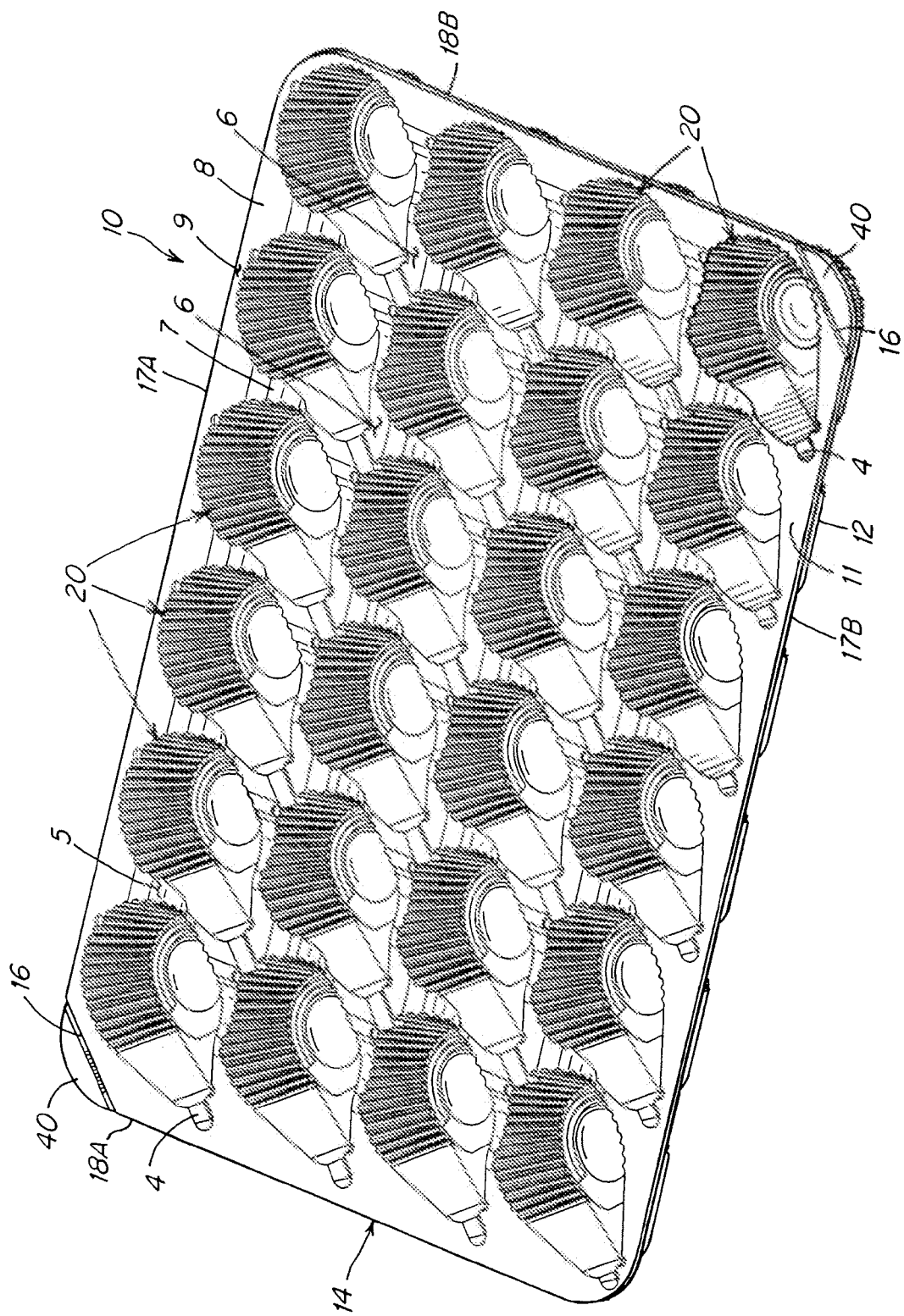
FIG. 1 is a top perspective view of a packing tray for pears according to one embodiment of the invention.
Figure 25:
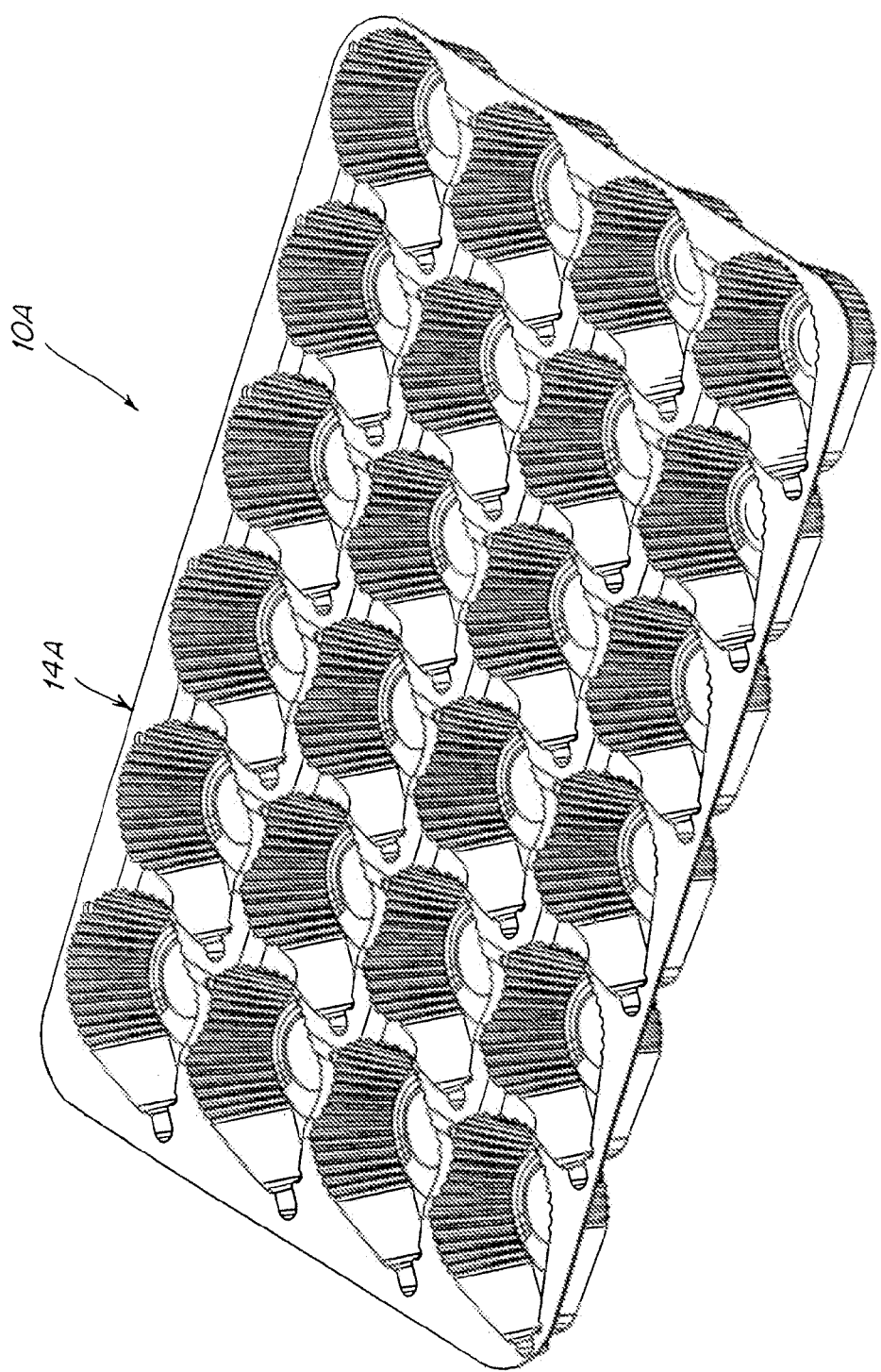
FIG. 25 is a top perspective view of a packing tray for pears according to another embodiment of the invention, similar to FIG. 1 but without the folded corner hinges.

FIG. 25 is a top perspective view of another embodiment of the invention, similar to FIG. 1, but wherein tray 10A has an alternative trim perimeter 14A without the corner hinges 40. Also the stem grooves have a closed end portion as in FIG. 21.

Figure 26:
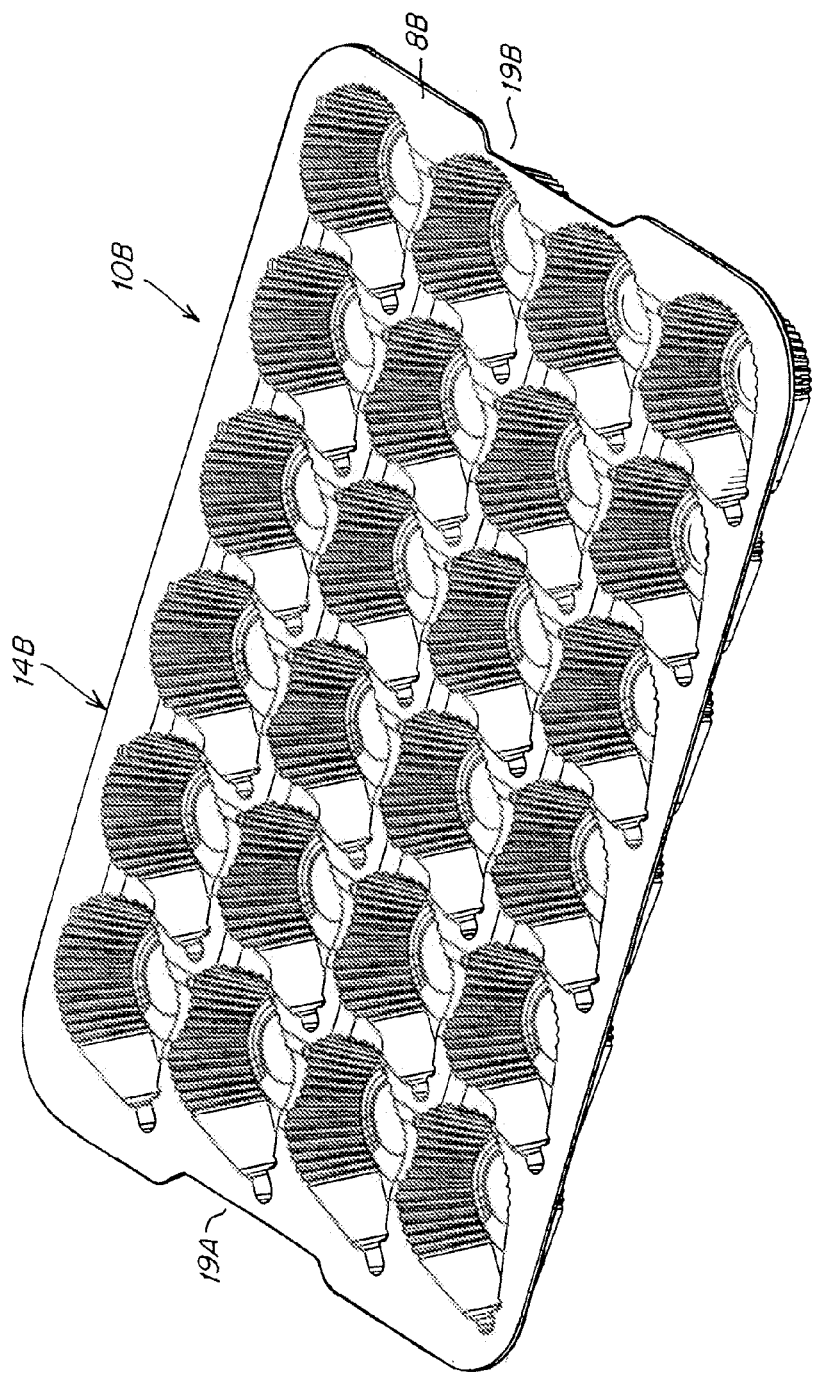
FIG. 26 is a top perspective view of another embodiment of the invention similar to FIG. 25 but including an alternative trim configuration with notched areas or slots on the opposing side edges for gripping the tray.

FIG. 26 is a further embodiment of the invention wherein tray 10B has an alternative trim configuration 14B, similar to FIG. 25, but further including notched areas 19A, 19B in the top wall 8B on opposing ends. The notched areas (e.g., about ½ inch deep) allow a packer to insert their fingers to lift the tray out of the case more evenly and minimize the chance of tearing the tray. Preferably the notches have angled corners (e.g., obtuse corners as shown). The notches are preferably aligned with the longitudinal centerline of the top wall. The distance between the outermost edge of the cell pocket array and the tray perimeter may be increased to allow for the notched areas (cutout portions) 19A, 19B of the top wall while still maintaining a continuous top wall perimeter around the array of cell pockets.

As is readily apparent, numerous modifications and changes may readily occur to those skilled in the art. Hence, the disclosure herein is not intended to limit the invention to the exact construction and operation shown and described. All suitable equivalents are included within the scope of the invention as claimed.

The invention claimed is:

1. A packing tray for packaging pears and other pear shaped fruit, the packing tray comprising:
   a plastic foam sheet comprising a top wall and an array of recessed cell pockets extending from the top wall;
   the top wall having a peripheral surface surrounding the array of cell pockets and defining a top reference plane TRP;
   each cell pocket comprising a pear shaped recess having an elongated longitudinal axis LA parallel to the TRP and configured to be substantially aligned with a longitudinal axis of a pear or pear shaped fruit lying on its side in the recess, and a transverse axis A;
   the pear shaped recess including an upper tapered cell portion configured to receive an upper tapered portion of a pear and a lower rounded cell portion configured to receive a larger diameter base of a pear lying on its side in the recess;
   the tapered cell portion having a pair of opposing sidewalls that flare outwardly to join a rounded sidewall of the rounded cell portion, and the tapered cell portion having a bottom surface inclined with respect to the TRP and joining the flaring sidewall portions;
   the rounded cell portion further including a bottom portion including a plurality of circumferential flutes surrounding a central depression, the sidewall of the rounded cell portion including a plurality of linear flutes disposed substantially transverse to the TRP;
   wherein the sidewall flutes and circumferential flutes flex in response to the weight and dimensions of the fruit enabling the depression to move both parallel to and laterally with respect to the transverse axis A to accommodate different dimensions and weights of fruit disposed in each cell pocket.

2. The packing tray of claim 1, wherein the top wall includes cell dividers between the pockets having divider surfaces in the TRP.

3. The packing tray of claim 2, wherein the dividers include recessed surfaces below the TRP.

4. The packing tray of claim 1, wherein the top wall includes a groove adjacent the upper tapered portion of each cell pocket shaped to receive a pear stem.

5. The packing tray of claim 1, wherein the depression is a shallow recess.

6. The packing tray of claim 1, wherein the depression has an oblong shape perpendicular to the transverse axis A, with the oblong depression having an elongated axis aligned with the elongated longitudinal axis L of the cell pocket.

7. The packing tray of claim 6, wherein the oblong depression has a center point CP on the elongated axis that moves both parallel to the transverse axis A and laterally with respect to the transverse axis A in response to different dimensions and weights of fruit in the pocket.

8. The packing tray of claim 1, wherein the cell pockets are arranged in longitudinal rows and columns.

9. The packing tray of claim 1, wherein the sheet has a substantially rectangular perimeter and the cell pockets are arranged in a rectangular array of longitudinal rows and latitudinal columns.

10. The packing tray of claim 9 wherein the top wall includes a pair of opposing notched areas in the peripheral surface surrounding the array of cell pockets, the notched areas being disposed at either end of the longitudinal rows.

11. The packing tray of claim 10, wherein the notched areas are disposed along the longitudinal centerline of the array.

12. The stack of packing trays and box of claim 10, wherein the box comprises a rectangular shaped base having interior dimensions that exceed the rectangular dimensions of the perimeter of the tray, thus providing a gap between the perimeter of the tray and the interior surface of the box.

13. A stack of packing trays comprising at least two packing trays of claim 1 stacked one on top of the other with fruit disposed in the cell pockets and the second tray rotated 180° with respect to the first tray.

14. The stack of packing trays of claim 13, disposed in a box for storage, shipment or display.

15. The packing tray of claim 1, wherein the plastic foam material comprises one or more of polystyrene, polyester, polyolefin, polypropylene, poly(lactic acid), including homopolymers, co-polymers and mixtures thereof, and including virgin and reclaimed materials.

16. The packing tray of claim 1, wherein the plastic material comprises polystyrene foam.

17. The packing tray of claim 1, wherein the rounded cell portion bottom is relatively thicker than the rounded cell portion sidewall.

18. The packing tray of claim 1, wherein at least the depression is relatively thicker than the rounded cell portion sidewall.

19. The packing tray off claim 1, wherein the top wall is substantially rectangular shaped and has a foldable hinge formed in each of two opposing corners of the rectangular shaped top wall.

20. The packing tray of claim 19, wherein the hinge comprises a reduced thickness hinge line in the top wall and a peripheral hinge portion, wherein the peripheral hinge portion can be folded at the hinge line.

21. The packing tray of claim 20, wherein the peripheral hinge portion can be folded back on itself to provide a folded portion for gripping.

22. A packing case comprising:
a stack of packing trays comprising at least two packing trays of claim 1 stacked one on top of the other with fruit disposed in the cell pockets and the second tray rotated 180° with respect to the first tray;
the trays accommodating variations in weight and dimensions of the fruit by deflection of the depression of the rounded cell portion.

23. A method of making the packing tray of claim 1, including molding the sheet between matching mold surfaces to form the cell pockets.

24. A method of packing fruit comprising:
packing fruit in the cell pockets of the packing tray of claim 1;
packing a second tray of claim 1 with fruit wherein the second tray is rotated 180° with respect to the first tray;
allowing the varying weights and dimensions of the fruit in each pocket to displace the rounded cell portion;
wherein the displacement allows fruit of varying dimensions and weights to be packed in a standard case volume.

* * * * *

UNITED STATES PATENT AND TRADEMARK OFFICE
CERTIFICATE OF CORRECTION

PATENT NO.         : 9,539,757 B2
APPLICATION NO.    : 13/927345
DATED              : January 10, 2017
INVENTOR(S)        : Ramirez et al.

It is certified that error appears in the above-identified patent and that said Letters Patent is hereby corrected as shown below:

In the Claims

In Column 11:

The Claim number "12" should be deleted and changed to Claim number -- 14 -- and the claim dependency on Line 11 "claim 10" should be deleted and changed to -- claim 13 --.

The Claim number "13" should be deleted and changed to Claim number -- 12 --.

The Claim number "14" should be deleted and changed to Claim number -- 13 -- and the claim dependency on Line 20 "claim 13" should be deleted and changed to -- claim 12 --.

Signed and Sealed this
Fourth Day of April, 2017

Michelle K. Lee
*Director of the United States Patent and Trademark Office*